(12) United States Patent
Riley et al.

(10) Patent No.: US 6,246,999 B1
(45) Date of Patent: Jun. 12, 2001

(54) FINANCIAL SERVICES ACCOUNT MANAGER SYSTEM

(75) Inventors: James F. Riley, Frederick; John A. Sudec, Hagerstown, both of MD (US); Timothy James Abram, Coral Springs, FL (US)

(73) Assignee: First Data Corporation, Hackensack, NJ (US)

( * ) Notice: Subject to any disclaimer, the term of this patent is extended or adjusted under 35 U.S.C. 154(b) by 0 days.

(21) Appl. No.: 09/100,434

(22) Filed: Jun. 19, 1998

(51) Int. Cl.[7] ................................................. G06F 17/60
(52) U.S. Cl. ............................ 705/30; 705/35; 705/38; 705/39; 705/40; 705/42
(58) Field of Search ................................. 705/30, 35, 38, 705/39, 40, 42; 707/10, 1, 4, 201

(56) References Cited

U.S. PATENT DOCUMENTS

| | | | |
|---|---|---|---|
| 5,699,528 | * | 12/1997 | Hogan .................................. 705/40 |
| 5,752,246 | * | 5/1998 | Rogers et al. ......................... 707/10 |
| 5,787,403 | * | 7/1998 | Randle ................................. 705/43 |
| 5,920,848 | * | 7/1999 | Schutzer et al. ...................... 705/42 |
| 5,933,816 | * | 8/1999 | Zeanah et al. ........................ 705/35 |
| 5,945,653 | * | 8/1999 | Walker et al. ....................... 235/380 |

FOREIGN PATENT DOCUMENTS 0481 135 A1 * 4/1992 (EP) .

OTHER PUBLICATIONS

"Xtranet Announces Acquisition of DataGate International," Business Wire, Apr. 29, 1998.*
"Xtranet Announces Shareholder Approval of DataGate International Acquisition," Business Wire, May 18, 1998.*
"Xtranet Announces Expansion of DataBank Network,"Business Wire, Aug. 27, 1998.*
"Secured Electronic Commerce: Smith Names Fisk, Gartner Vice Presidents of Secured Electronic Commerce Clearinghouse," Aug. 15, 1997.*

* cited by examiner

Primary Examiner—Edward R. Cosimano
Assistant Examiner—J. Harle
(74) Attorney, Agent, or Firm—Brooks & Kushman P.C.

(57) ABSTRACT

A method of reporting accounting information to acquiring banks includes compiling accounting information from different processing systems to a mainframe. The accounting information is then routed to a database residing on a server operable with the World Wide Web (WWW). Different reports of the accounting information are then accessed with a client station operable with the server.

1 Claim, 6 Drawing Sheets

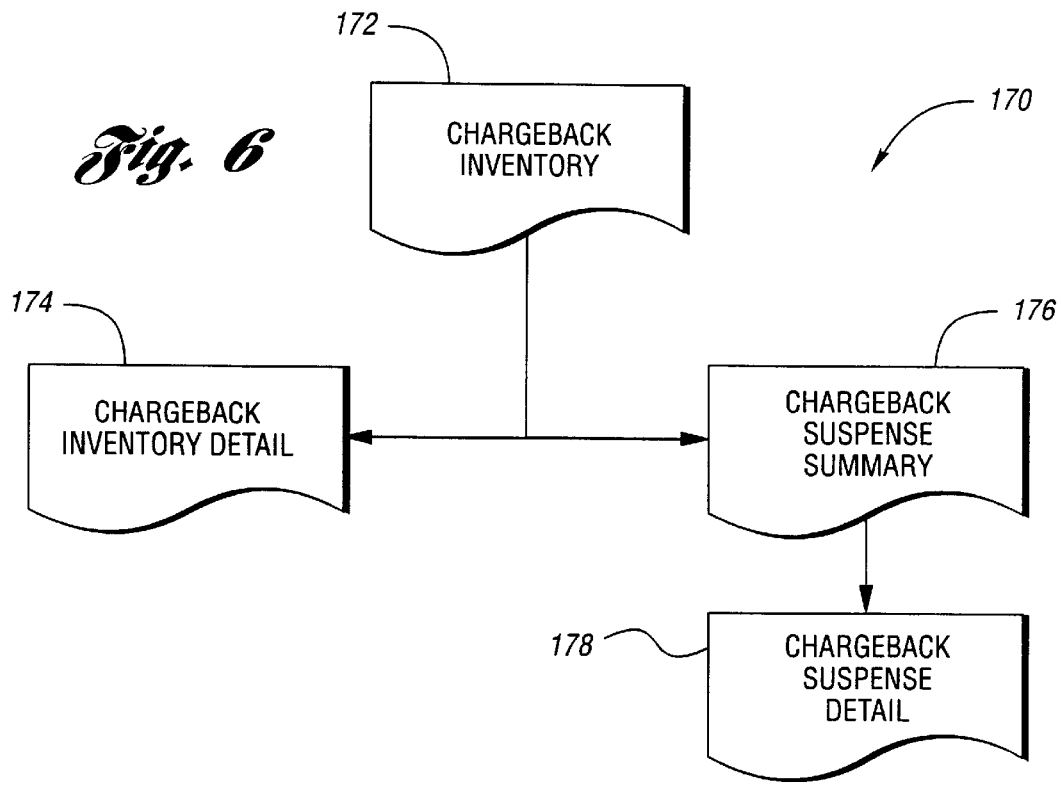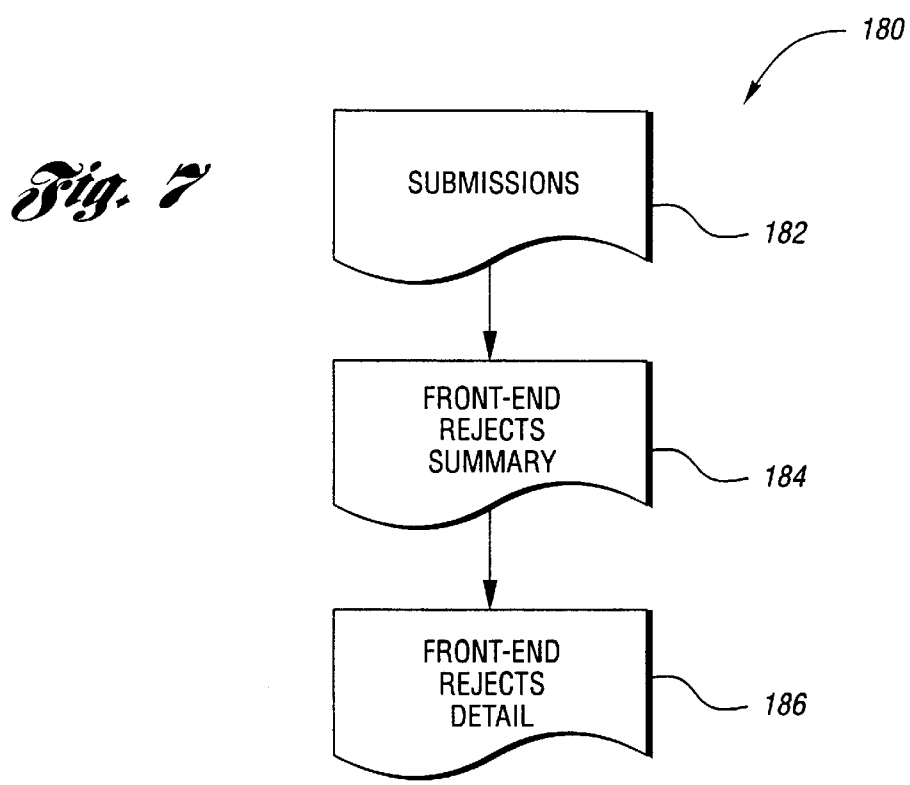

FINANCIAL SERVICES ACCOUNT MANAGER SYSTEM

TECHNICAL FIELD

The present invention relates generally to the consolidation into a single source work flow database and the distributed presentation via the World Wide Web (WWW) of settlement and balancing (accounting) information for credit card acquiring systems.

BACKGROUND ART

A combination of computer generated paper reports and manually generated spreadsheet inventory queues were used in the past for the presentation of accounting reports to credit card acquiring systems. A problem with this approach is that the labor intensive process of combining the reports and the spreadsheets is directly proportional to the level of transaction volume. This is a constraint to future growth in terms of labor resources, facilities, and the amount of time required to manually compile and track the data. Another problem with this approach is that because of the numerous information sources (reports and spreadsheets) there is no single (centralized) source for work of an acquiring's settlement position.

What is needed is an on-line method of providing a secured, on-line access of daily settlement information via the World Wide Web (WWW) for acquiring bank clients.

SUMMARY OF THE INVENTION

Accordingly, it is an object of the present invention to provide a method of presenting accounting reports for use on the World Wide Web (WWW) by external bank clients.

In accordance with the above object and other objects, the present invention provides a method of reporting accounting information to acquiring banks. The method includes compiling accounting information from different processing systems to a mainframe. The accounting information is then routed to a database residing on a server operable with the World Wide Web (WWW). Different reports of the accounting information are then accessed with a client station operable with the server.

The advantages of the present invention are numerous. For example, the present invention eliminates the need for manually generated balancing proofs, populated from paper reports (cut and paste). The present invention also accelerates delivery and presentation of settlement information to acquiring bank clients. The present invention can be deployed along side other acquiring processing systems to streamline their process and reduce the time between submission and settlement position.

These and other features, aspects, and embodiments of the present invention will become better understood with regard to the following description, appended claims, and accompanying drawings.

BRIEF DESCRIPTION OF THE DRAWINGS

FIG. 6 illustrates a chargebacks report relationship diagram; and

FIG. 7 illustrates a submissions report relationship diagram.

BEST MODES FOR CARRYING OUT THE INVENTION

Figure 1:
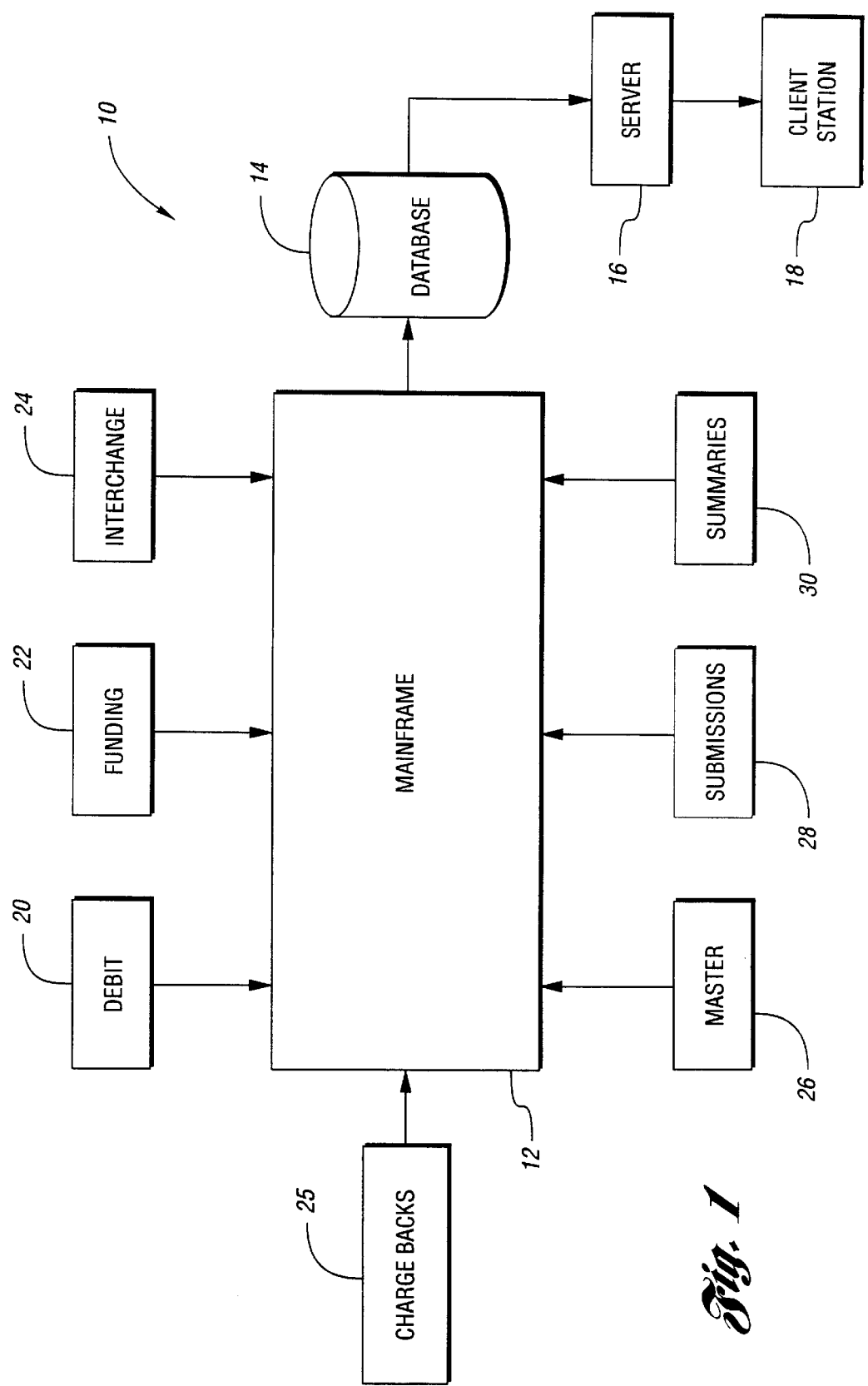
FIG. 1 illustrates a block diagram of a system for carrying out the method of the present invention.

Referring now to FIG. 1, a financial account services management system (FSAMS) 10 for carrying out the method of the present information is shown. System 10 includes a mainframe 12, a database 14, a server 16, and a client station 18. Mainframe 12 is operable to receive accounting information from debit processing system 20, funding processing system 22, interchange processing system 24, chargeback processing system 25, master processing system 26, submissions processing system 28, and summaries processing system 30.

Mainframe 12 includes a series of COBOL 2 jobs that capture detail level rejected financial transaction information from processing systems 20, 22, 24, 25, 26, 28, and 30. Mainframe 12 uses the information to populate an internal mainframe DATACOM corp. database. Mainframe 12 validates and then provides the information to database 14. Database 14 is preferably provided by ORACLE Corp and resides on server 16. Database 14 contains procedures and calls that capture the detail and summary level data that is supplied from mainframe 12. Database 14 stages the accounting information to make it available to a user at client station 18.

A user at client station 18 accesses via a web browser interface the accounting information from server 16. A user at client station 18 can execute report requests in a dynamic environment that allows the user to change report parameters, report, and drill-down to finer levels of detail where needed. When a request is made by the user, server 16 executes the required queries against database 14, formats the result set, and then sends the finished reports to the user at client station 18 in HTML format.

Figure 2:
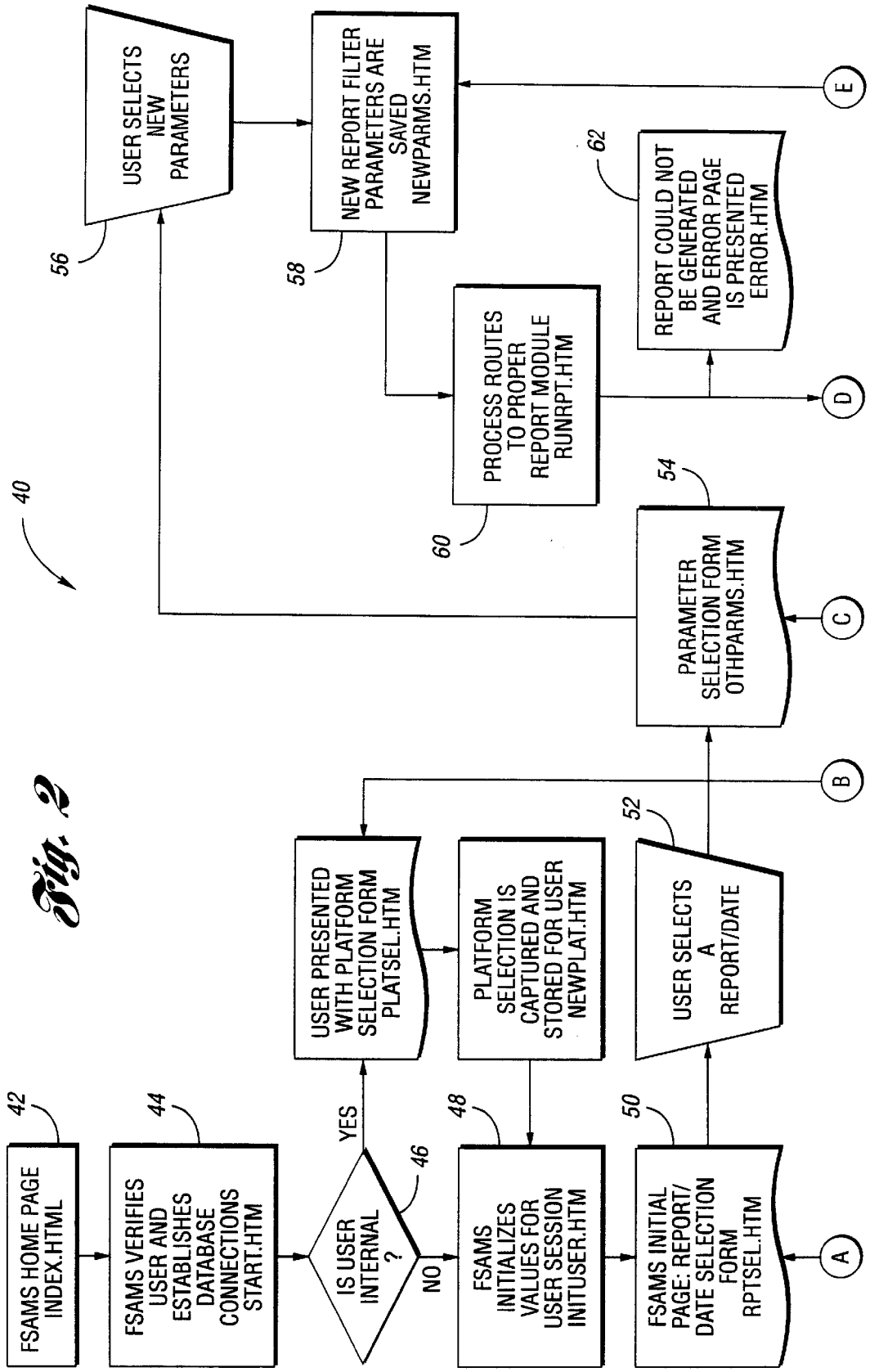
FIG. 2 illustrates a flow diagram representing operation of the method of the present invention.

Referring now to FIG. 2 with continual reference to FIG. 1, a flow diagram 40 representing operation of the method of the present invention is shown. Initially, block 42 enables a user to access a home page of the FSAMS system. Block 44 then verifies the user and establishes database connections between server 16 and database 14. Decision block 46 then determines if the user is an internal or external user. An internal user is a user on an Intranet operable with server 16. An external user is a user on the Internet, i.e., World Wide Web, operable with server 16.

If the user is external, then block 48 initialize values for the user session. Block 50 then displays a report/date selection form on client station 18. The user selects a report and date as indicated by block 52. Block 54 then displays a parameter selection form on client station 18. The user then selects new parameters as indicated by block 56. Block 58 saves the new report filter parameters. Block 60 then process routes to the proper report module. Block 62 then displays an error page indicating that the report could not be generated if the report could not be generated. Block 64 then generates the report based on the parameters selected by the user in block 56. Block 66 then displays a report page on client station 18.

The user may then select the report drill-down link at block 68 to continue the process again at block 58. The user may also select the download option at block 70. This causes block 72 to redirect the download file to the user.

From block 66, the user may also choose to select new parameters at block 74 to start the process again at block 54.

If the user is internal, the user may choose to pick a new platform at block 76. From block 66, the user may also select a new report as indicated by block 78 to start the process again at block 50.

Figure 3:
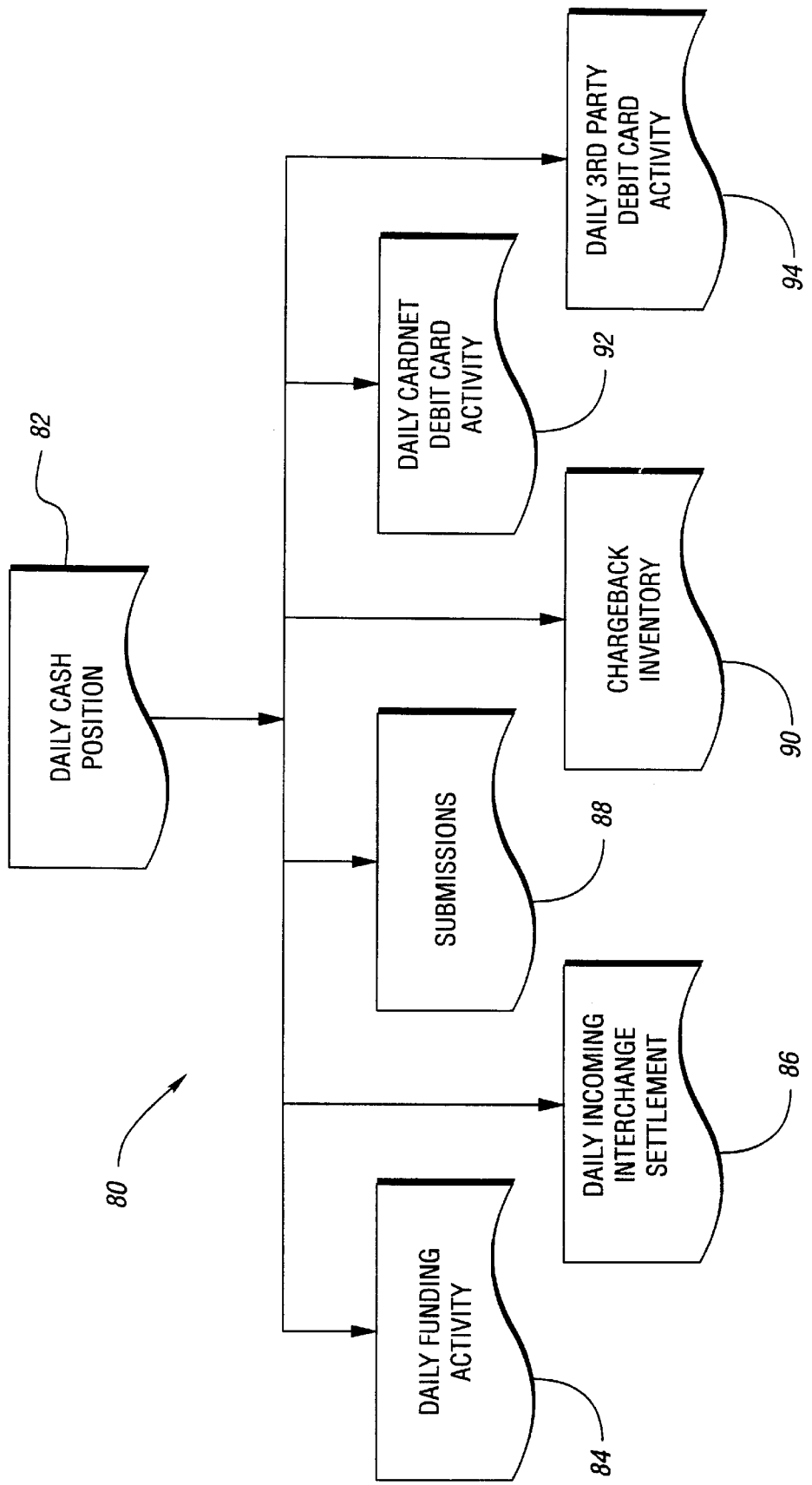
FIG. 3 illustrates a cash position report relationship diagram.

As described below, many report options are available within to view settlement and balancing information. Referring now to FIG. 3, a cash position report relationship diagram 80 is shown. A daily cash position report 82 provides summary information of cash in (interchange settlement) and cash out (funding to merchants). Daily funding activity report 84 provides a summary of merchant daily funding activities. Daily incoming interchange settlement report 86 provides summary information of incoming interchange settlement information. An interchange is the system operated by credit card companies for authorization and settlement, and the passing through of other fees and information. Settlement is the process by which merchant and card holder bank exchange financial data and value resulting from sales transactions, cash advances, and merchandise credits.

Submissions report 88 provides a summary of data capture information regarding submitted, accepted, and rejected dollar and item totals for all bankcard, licensing, pass through, and debit card types. Report 80 includes a breakdown by transaction type (i.e., sales, cash advances, returns). Chargeback inventory report 90 provides a summary of chargeback information including beginning and ending balance and ending balance of work in process. Information in report 80 is provided by aging bucket. A chargeback represents a transaction that has been challenged by a card holder and returned through interchange to the acquiring bank by a card holder issuing bank.

Daily cardnet debit card activity report 92 provides a summary of Cardnet debit card activity. Cardnet is a First Data Merchant Services, Corp. propriety terminal and data capture system. Daily third party debit card activity report 94 provides a summary of third party debit card activity.

Figure 4:
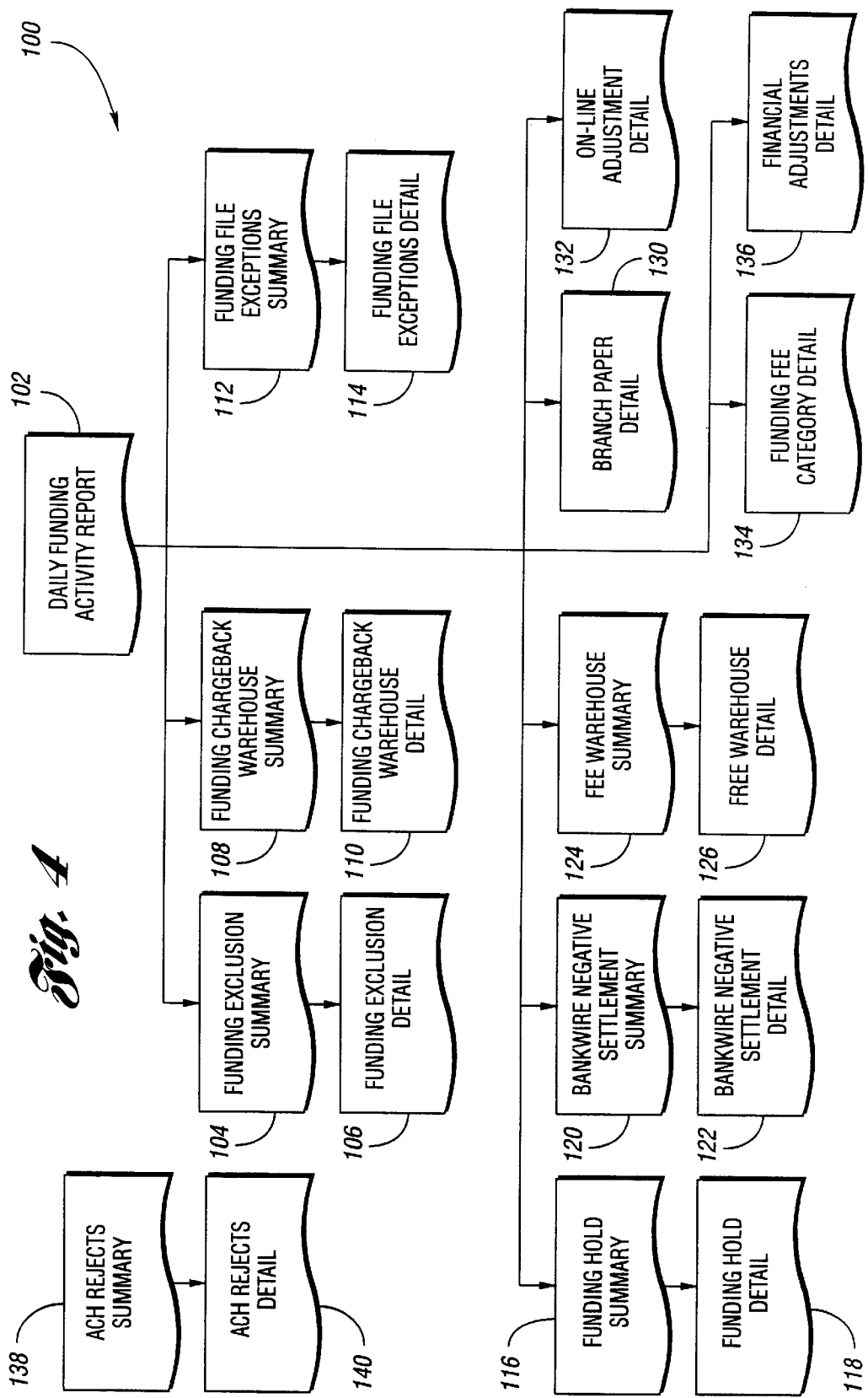
FIG. 4 illustrates a funding report relationship diagram.

Referring now to FIG. 4, a funding report relationship diagram 100 is shown. A daily funding activity report 102 provides a summary of merchant funding information including daily funding activities. A funding exclusion summary report 104 provides funding exclusion warehouse information including beginning and ending balance and daily activity. A funding exclusion detail form 106 provides funding exclusion warehouse detail to the outlet level.

A funding chargeback warehouse summary report 108 provides a summary of funding chargeback warehouse. A funding chargeback warehouse summary report 110 provides a detail of funding chargeback warehouse items.

A funding file exceptions summary report 112 provides a summary of funding file rejects. A funding file exceptions detail report 114 provides a detail of funding file reject transactions.

A funding hold summary report 116 provides a summary of held/released merchant funding information including beginning, ending balance, and daily activity. A funding hold detail report 118 provides detail of held/released merchant funding items.

A bankwire negative settlement summary report 120 provides a summary of bankwire negative summary dollars. A bankwire negative settlement summary report 122 provides a detail view of branch paper deposits.

A fee warehouse summary report 124 provides a summary of fees incurred in posting. A fee warehouse detail report 126 provides a summary of fees incurred grouped by record type.

Other reports corresponding to daily funding activity report 102 include branch paper detail report 130, on-line adjustment detail report 132, funding fee category detail report 134, and financial adjustments detail report 136.

ACH rejects summary report 138 provides a summary view of ACH suspense inventory. ACH stands for automated clearing house which is a central distribution and settlement point for electronic items exchanged between financial institutions. ACH rejects detail report 140 provides a detail view of suspense inventory items.

Figure 5:
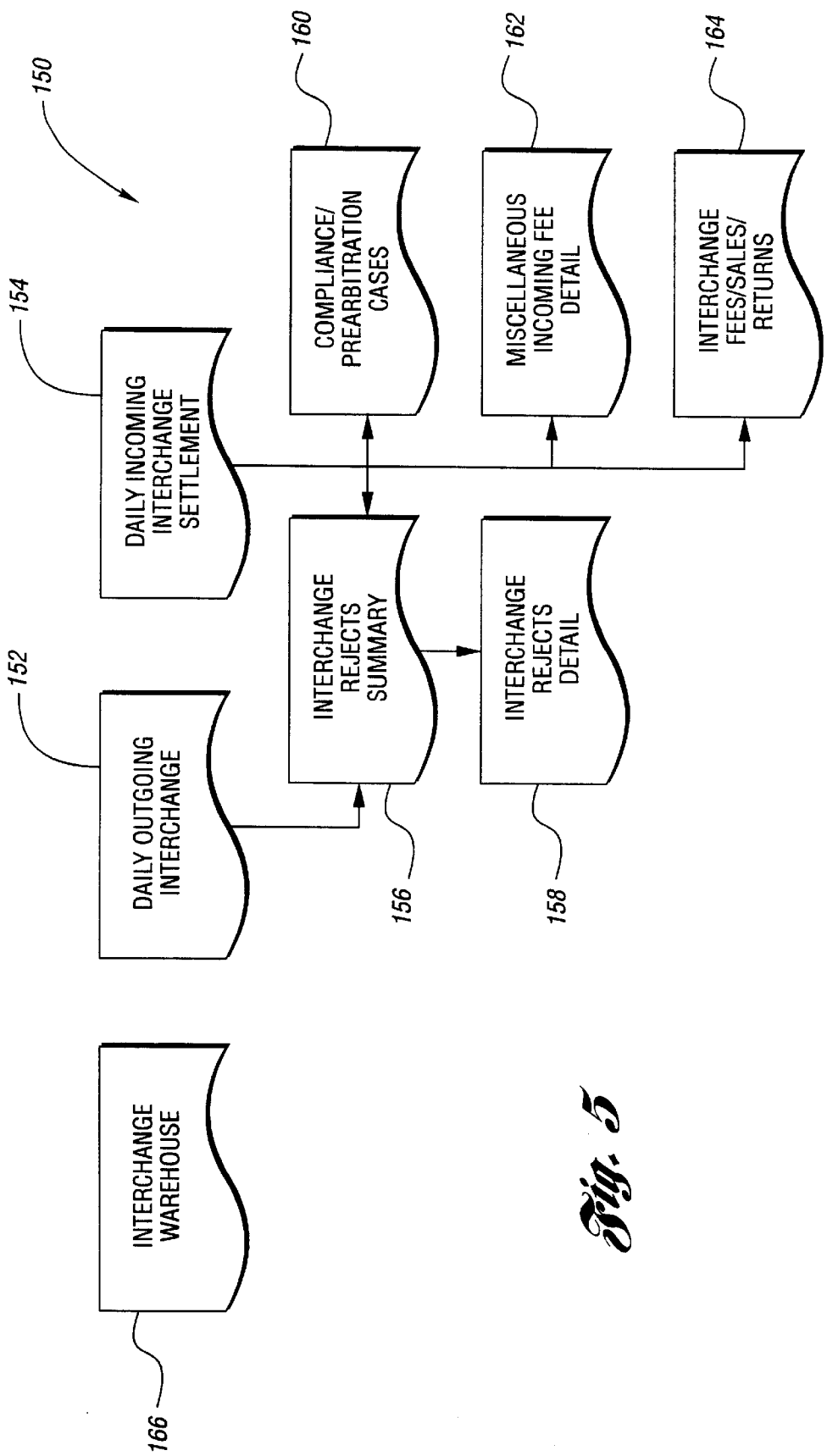
FIG. 5 illustrates an interchange report relationship diagram.

Referring now to FIG. 5, an interchange report relationship diagram 150 is shown. A daily outgoing interchange report 152 provides a summary of outgoing interchange information. A daily incoming interchange report 154 provides a summary of incoming interchange information. An interchange rejects summary 156 provides high level drill-down into interchange reject suspense. An interchange rejects detail 158 provides a detail of interchange rejects in suspense.

A compliance/prearbitration cases report 160 provides a detail of incoming compliance and prearbitration cases. A miscellaneous incoming fee detail report 162 provides a detail of miscellaneous incoming association fees. An interchange fees/sales/returns report 164 provides a detail of incoming association fees/sales/returns. An interchange warehouse report 166 provides a high level summary of interchange information into and out of the warehouse.

Referring now to FIG. 6, a chargebacks report relationship diagram 170 is shown. A chargeback inventory report 172 provides a high level summary of chargeback activity. A chargeback inventory detail report 174 provides a detail of chargeback inventory items. A chargeback suspense summary report 176 provides a summary of chargebacks in suspense. A chargeback suspense detail report 178 provides a detail view of chargebacks in suspense.

Referring now to FIG. 7, a submissions report relationship diagram 180 is shown. A submissions report 182 provides data capture information as stated above. A front-end rejects summary 184 provides a high level drill-down into PTS suspense. A front-end rejects report 186 provides a detail of PTS rejects in suspense.

As described above, data reported within FSAMS 10 is gathered from seven different data streams of processing systems 20, 22, 24, 25, 26, 28, and 30. Some of the summary reports in FSAMS 10 show information from more than one of these data streams. FSAMS 10 creates partial (estimated) reports with whatever data is available to remedy possible timing issues. The current status of each of the data streams is kept and updated within database 14 as the extracts from mainframe 12 become available.

Thus it is apparent that there has been provided, in accordance with the present invention, a method of reporting accounting information to acquiring banks that fully satisfies the objects, aims, and advantages set forth above.

While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method of reporting accounting information to acquiring banks, the method comprising:

compiling accounting information from different processing systems to a mainframe, the different processing systems including a debit processing system, a funding processing system, an interchange processing system, a chargeback processing system, a master processing system, a submissions processing system, and a summaries processing system;

routing the accounting information from the mainframe to a database residing on a server operable with the World Wide Web (WWW);

receiving a request for a report of the accounting information at the server from a client station operable with the server via the World Wide Web, wherein reports available for request include a cash position report, a funding report, an interchange report, a chargeback report, and a submissions report;

executing queries associated with the requested report on the accounting information stored in the database to generate the requested report; and accessing the requested report of the accounting information with the client station operable with the server.

* * * * *